UNITED STATES PATENT OFFICE.

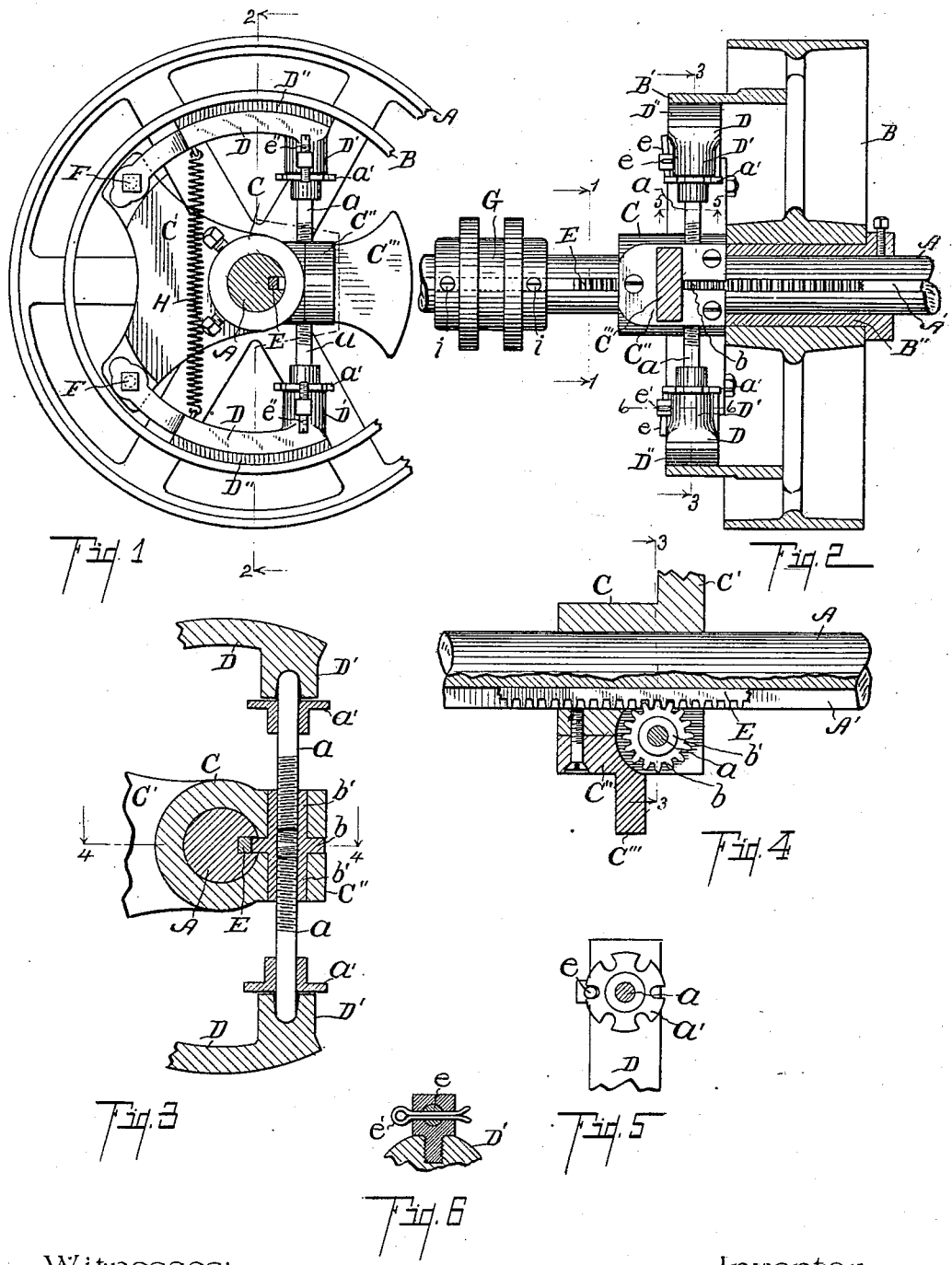

CORNEIL RIDDERHOF, OF GRAND RAPIDS, MICHIGAN, ASSIGNOR TO WILMARTH & MORMAN CO., OF GRAND RAPIDS, MICHIGAN.

FRICTION-CLUTCH.

SPECIFICATION forming part of Letters Patent No. 691,488, dated January 21, 1902.

Application filed March 13, 1901. Serial No. 50,918. (No model.)

*To all whom it may concern:*

Be it known that I, CORNEIL RIDDERHOF, a citizen of the United States, residing at the city of Grand Rapids, in the county of Kent and State of Michigan, have invented certain new and useful Improvements in Friction-Clutches, of which the following is a specification.

This invention relates to improvements in friction-clutches, the friction-clutch here illustrated being especially adapted for counter-shaft work, although a clutch on the same principle can be used wherever such a clutch may be required.

The objects of my invention are, first, to produce a clutch which is simple to manufacture and highly efficient and practical and easy to operate and effective to control the transmission of power; second, to provide in a clutch an improved adjusting means whereby only a limited movement of the parts is required; third, to provide an improved arrangement and combination of parts for a friction-clutch in which there shall be no lost motion in manipulation, and, fourth, to provide a compact and efficient actuating means for a friction-clutch.

Further objects will definitely appear in the detailed description to follow.

I accomplish the objects of my invention by the devices and means described in the following specification.

The invention is clearly defined and pointed out in the claims.

A structure embodying the features of my invention is fully illustrated in the accompanying drawings, forming a part of this specification, in which—

Figure 1 is a detail sectional elevation of my improved clutch, taken on a line corresponding to line 1 1 of Fig. 2, a portion of the rims being broken away. Fig. 2 is a detail longitudinal view, partially in section on the irregular line 2 2 of Fig. 1. Fig. 3 is a detail sectional elevation through the friction-shoes, actuating means, and hub, taken on a line corresponding to lines 3 3 of Figs. 2 and 4. Fig. 4 is a detail view of the hub and shaft and actuating rack and pinion, taken partially in section on line 4 4 of Fig. 3. Fig. 5 is a detail sectional view of the shoe-adjusting means, taken on a line corresponding to line 5 5 of Fig. 2. Fig. 6 is a detail cross-sectional view taken on line 6 6 of Fig. 2, showing the preferred form of locking-pin.

In the drawings all the sectional views are taken looking in the direction of the little arrows at the ends of the section-lines and similar letters of reference refer to similar parts throughout the several views.

Referring to the lettered parts of the drawings, A is the shaft which contains the longitudinal groove A', which is like a long keyseat. E is a rack which is adapted to reciprocate in the said groove and serves as an actuating means for the clutch, the rack being secured by screws *i i* to a grooved collar G for the reception of a bifurcated shipper-lever or other similar means. Surrounding the shaft and the rack E, which is contained therein, is a sleeve B'', which is provided with a bearing-surface like a journal and on which the pulley B is mounted and free to revolve. This pulley B has a secondary rim B', projecting to one side to receive on its inner surface the friction-shoes of the clutch and be engaged thereby.

Securely attached to the shaft A is a hub C, having arms C' projecting to one side and a counterweight C''' to the opposite side. To the arms C' are pivoted the friction-shoes D D, which are provided with faces D'' D'', of leather, wood, or any suitable material, those enumerated being preferred. On the outer or free ends of these friction-shoes D are sockets D' D', which receive the ends of the actuating-screws, the same being sufficiently large to admit the ends of the screws freely.

Supported in a suitable bearing on the side of the hub C is a sleeve *b'*, having a pinion *b* at its center part which projects inwardly sufficiently far to engage the rack E, before referred to, in order that it may be actuated thereby when it is reciprocated. The cap C'' to this bearing carries the counterweight C''', hereinbefore referred to. I prefer to make this sleeve and pinion of a single piece, though it is obvious that the same could be constructed otherwise. The opposite ends of the sleeve are internally screw-threaded, one end having a right-hand thread and the opposite end a left-hand thread. Screws *a a* extend into the same and are provided with little disks $a'$ $a'$ on their outer ends for the purpose of adjusting the same, and a pin $e$ extends through a small eye on the outside of each socket D' into suitable notches in the disks or wheels $a'$ for the purpose of preventing the rotation of the screws and for holding them securely in their adjusted positions. A small cotter-pin extends transversely through the socket and pin. This pin $e$ is the preferred construction, although a screw $e''$, as shown in Fig. 1, is quite satisfactory. The use of the disks $a'$ enables the perfect and equal adjustment of the shoes at any time to take up the wear of the same, and thus keep the pressure of both shoes exactly even. A suitable spring, as the coiled spring H, draws the friction-shoes D D normally toward each other into close contact with the outer ends of the screws $a$ $a$, so that the slightest movement of said screws is imparted to the shoes.

I have thus enumerated and described the various parts of my improved friction-clutch. When it is desired to operate the clutch, the shipper-lever is moved back and forth, which actuates the rack E, which engages the pinion $b$ and actuates the same, which causes the screws $a$ $a$ to move the shoes either out or in, depending on the direction of the movement of the lever. With the tension device, as shown, for taking up the lost motion and the adjusting means the pressure can be applied to the friction-shoes with great accuracy and will cause the same to engage the inside of the rim D' so gradually that the machinery will not start with a jerk, but by a gradual easy movement and without any noise. So accurately can this adjustment be made that any amount of speed can be transmitted by the device less than that of the driving-shaft, and the clutch can be so nicely adjusted that it will serve as a safety device and prevent the breakage or injury of the tools. This is obvious from an examination of the mechanism and when it is observed that a great length of stroke can be imparted to the rack E, so that the pinion B and the sleeve $b'$ $b'$ can be rotated sufficiently to carry the screws $a$ $a$ out and in, although the threads of said screws be quite fine.

It is desired to remark that the details of this improved clutch can be considerably varied without departing from my invention. The means I show for adjusting the screws $a$ is very simple and efficient and possesses great merit; but other means might be adopted that would be quite effective.

It is of very great advantage to locate the actuating-rack E in a groove in the shaft, because in this position a long rack can be readily and easily utilized, which is very desirable to secure sufficient movement to impart the required power to the friction-shoes. I have shown a facing to the friction-shoes which is very desirable because easily replaced when worn and possessing a high coefficient of friction, but of course could be easily dispensed with, if desired.

Having thus described my invention, what I claim as new, and desire to secure by Letters Patent, is—

1. The combination with the shaft A containing the longitudinal groove A'; a rack E in said groove with suitable means as collar G to actuate the same; the sleeve B'' secured to said shaft; the pulley B revolubly mounted on said sleeve, the said pulley having a secondary rim B' projecting to one side thereof; a hub secured to said shaft by suitable set-screws or equivalent means and having arms C'; friction-shoes D, D, pivoted at F, F, to said arms C'; said shoes D, having inwardly-projecting sockets D', D', at the ends thereof; a sleeve $b'$, $b'$, with pinion $b$ at the center, adapted to be engaged by the rack E, supported in a suitable transverse bearing in hub C; the sleeve $b'$, $b'$, being internally screw-threaded, one end right-handed and the other left-handed; screws $a$, $a$, corresponding to the ends of said sleeve; disks $a'$, $a'$, on said screws $a$ for adjusting the same; and locking-pins $e$, extending through ears on the sides of the sockets D' to engage said disks $a'$, to hold them in adjustment and prevent their rotation, and a spring H drawing the shoes D, D, toward each other, all coacting substantially as described for the purpose specified.

2. The combination with the shaft A containing the longitudinal groove A'; a rack E in said groove with suitable means as collar G to actuate the same; the sleeve B'' secured to said shaft; the pulley B revolubly mounted on said sleeve the said pulley having the secondary rim B' projecting to one side thereof; a hub C secured to said shaft by suitable set-screws or equivalent means and having arms C'; friction-shoes D, D, pivoted at F, F, to said arms C'; the said shoes D, having inwardly-projecting sockets D', D', at the ends thereof; a sleeve B' B' with pinion $b$ at the center adapted to be engaged by the rack E, supported in a suitable transverse bearing in hub C; the sleeve $b'$, $b'$, being internally screw-threaded, one end right-handed and the other left-handed; screws $a$, $a$, corresponding to the ends of said sleeve; disks $a'$, $a'$, on said screws $a$ for adjusting the same; and locking-pins $e$, extending through ears on the sides of the sockets D' to engage said disks $a'$, to hold them in adjustment and prevent their rotation, all coacting substantially as described, for the purpose specified.

3. In a friction-clutch, the combination of a suitable shaft; a pulley with a rim; a hub secured to said shaft, having projecting arms; friction-shoes pivoted to said arms; a spring drawing the same normally inward; inwardly-projecting sockets at the outer ends of said shoes; a sleeve with a pinion thereon supported in a transverse bearing in the hub; oppositely-threaded screws at each end of said sleeve, the ends of which engage in the said sockets; a rack in a longitudinal seat in said shaft arranged to engage the said pinion and means of reciprocating the same to actuate it, coacting for the purpose specified.

4. In a friction-clutch, the combination of the shaft; the hub thereon carrying suitable friction-shoes; springs for holding said shoes normally inward; a rack and pinion supported by said hub; right and left hand screws actuated by said pinion; disks $a'$ adapted to receive suitable locking-pins on said screws for adjusting the same, and means for locking said disks in position, coacting for the purpose specified.

In witness whereof I have hereunto set my hand and seal in the presence of two witnesses.

CORNEIL RIDDERHOF. [L. S.]

Witnesses:
LEWIS T. WILMARTH,
JOHN MORAN.